(12) United States Patent
Crossland et al.

(10) Patent No.: US 7,916,248 B2
(45) Date of Patent: Mar. 29, 2011

(54) LARGE SCALE LIQUID CRYSTAL STRUCTURES

(75) Inventors: William Alden Crossland, Harlow (GB); Anthony Bernard Davey, Cambridge (GB); Gang Sun, Beijing (CN); Alan Colin Dixon, Ipswich (GB)

(73) Assignees: Cambridge Enterprise Limited, Cambridge (GB); Advex Corporation Limited, Oxfordshire (GB)

( * ) Notice: Subject to any disclaimer, the term of this patent is extended or adjusted under 35 U.S.C. 154(b) by 620 days.

(21) Appl. No.: 11/664,045

(22) PCT Filed: Sep. 27, 2005

(86) PCT No.: PCT/GB2005/003705
§ 371 (c)(1),
(2), (4) Date: Apr. 16, 2008

(87) PCT Pub. No.: WO2006/035213
PCT Pub. Date: Apr. 6, 2006

(65) Prior Publication Data
US 2009/0015750 A1 Jan. 15, 2009

(30) Foreign Application Priority Data
Sep. 28, 2004 (GB) .................................. 0421538.0

(51) Int. Cl.
*G02F 1/1335* (2006.01)

(52) U.S. Cl. .......................................................... 349/113
(58) Field of Classification Search .................. None
See application file for complete search history.

(56) References Cited

U.S. PATENT DOCUMENTS
6,122,024 A * 9/2000 Molsen et al. .................. 349/88
6,606,138 B2 * 8/2003 Sonehara ...................... 349/113

FOREIGN PATENT DOCUMENTS
JP 10 068967 A 3/1998
JP 11 084403 A 3/1999
JP 11084403 A * 3/1999
WO WO 2004/079439 A 9/2004

OTHER PUBLICATIONS

Uchida, T., et al., "Bright Dichroic Guest-Host LCDs Without a Polarizer," Proceedings of the SID, Society for Information Display, Playa Del Rey, CA, 41-46 (1981).

* cited by examiner

*Primary Examiner* — Sung H Pak
(74) *Attorney, Agent, or Firm* — Hamilton, Brook, Smith & Reynolds, PC (57) ABSTRACT

A liquid crystal structure (200) comprising first and second reflective regions (214a, 214b, 214c) arranged to reflect respective first and second colours. The first and second reflective regions (214a, 214b, 214c) are disposed transversely to the direction of reflection (R). Each region includes a reflective back area and a selector (210) controllable to control light reflected from the region. Furthermore, a controllable reflector (212) is superposed over the reflective region in the direction of reflection (R) and controllable to transmit or scatter incident light.

23 Claims, 8 Drawing Sheets

LARGE SCALE LIQUID CRYSTAL STRUCTURES

RELATED APPLICATIONS

This application is the U.S. National Stage of International Application No. PCT/GB2005/003705, filed Sep. 27, 2005, published in English, and claims priority under 35 U.S.C. §119 or 365 to Great Britain Application No. 0421538.0, filed Sep. 28, 2004.

The invention relates to a liquid crystal (LC) structure for example for a liquid crystal display, and use of such a structure in billboards or other information displays used in high or variable ambient light environments e.g. machine instrumentation, enunciator boards, military hardware controls or other large-scale displays viewable from a distance.

Figure 1:
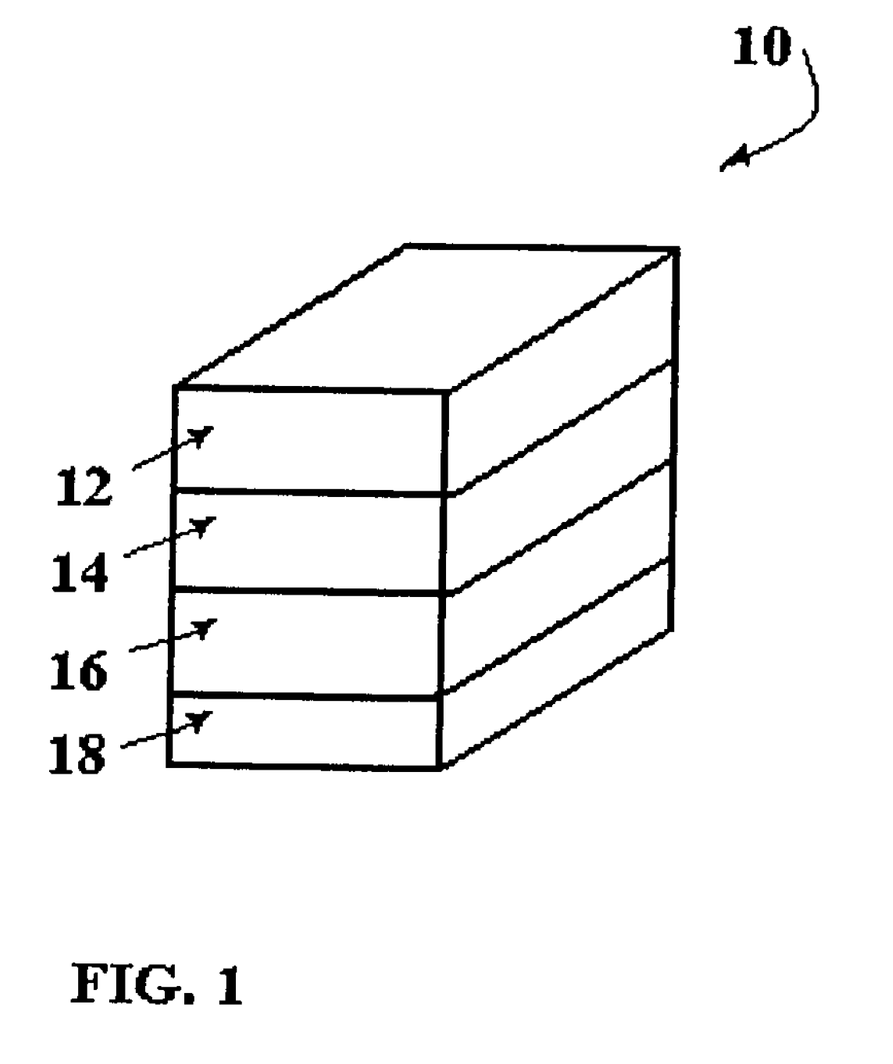
FIG. 1 is a perspective view showing an LC structure of known type.

One known liquid crystal display is described in US patent application 20030043316 which describes a stacked reflective display of the type shown very generally in FIG. 1. In particular the display 10 includes stacked layers of guest-host liquid crystal material 12, 14, 16 each arranged to reflect a selected wavelength of incoming light using a red/green/blue (RGB) scheme. Alternatively the level of reflection is determined by controlling the rotating pitch of the liquid crystal via appropriate electrodes allowing colour mixing. A base reflective layer 18 is further provided.

Various problems arise with this arrangement. The viewing angle is restricted because of parallax effects resulting from small, superposed LC elements. Furthermore a significant proportion of the light is lost in this arrangement as the RGB scheme absorbs two thirds of light passing through it.

Other problems arise with known LC arrays. In particular colour schemes including pure black and white are difficult to achieve. In addition, in many implementations polarisers are required which remove a portion of the incident light and hence reduce the brightness of the display.

Furthermore, these prior approaches have been attempting to provide high resolution, high refresh rate displays suitable for small-scale display applications such as mobile phone screens, PDA screens, computer monitors and televisions and are not suitable for large scale displays viewable from a distance such as posters, notices, billboards and signs.

The invention is set out in the attached claims.

Various advantages arise as a result of the invention. Because in one approach the reflective regions are disposed transversely, the thickness of an individual pixel is reduced whilst increasing the viewing angle and minimising the amount of light lost. In another approach where the absorptive regions corresponding to different colours are stacked, a compact arrangement with a wide colour spectrum is provided. Furthermore structures according to the invention are advantageous for large-scale displays such as billboards. Electronic billboards allow the exploitation of new sites previously not exploited.

Further advantages of embodiments of the invention are set out in the following description.

Embodiments of the invention will now be described, by way of example, with reference to the drawings of which:

FIG. 7a shows a side sectional view of an alternative reflector structure for the first embodiment;

FIG. 7b shows a detail of FIG. 7a;

FIG. 8a shows a side sectional view of a further alternative reflector structure for the first embodiment;

FIG. 8b shows a detail of FIG. 8a;

FIG. 8c is an exploded view of a pixel of FIG. 8a; and

Figure 2:
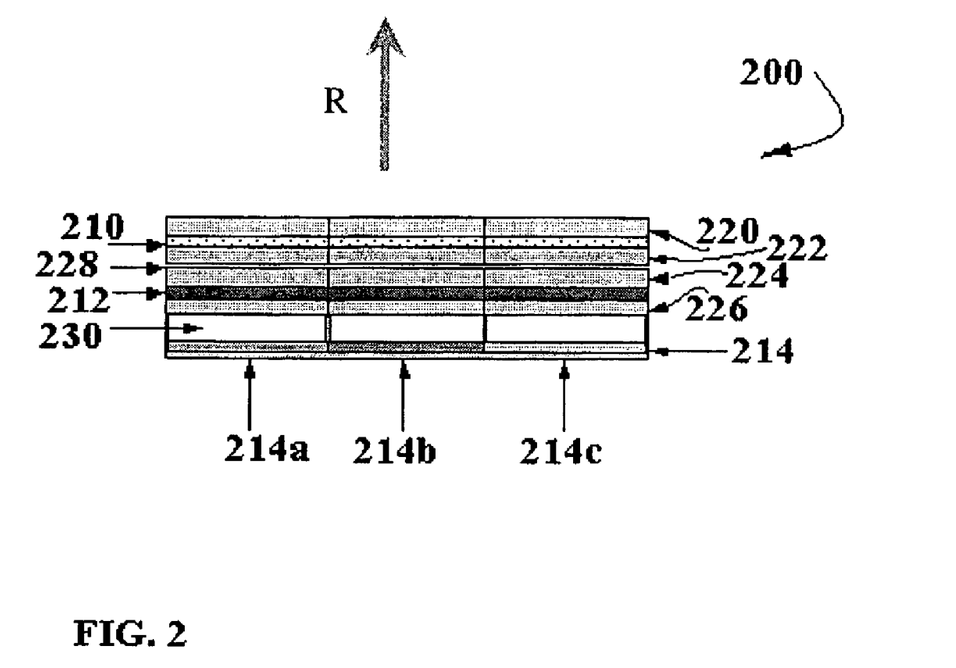
FIG. 2 is a side sectional view showing an LC structure according to a first embodiment of the invention.
Figure 3:
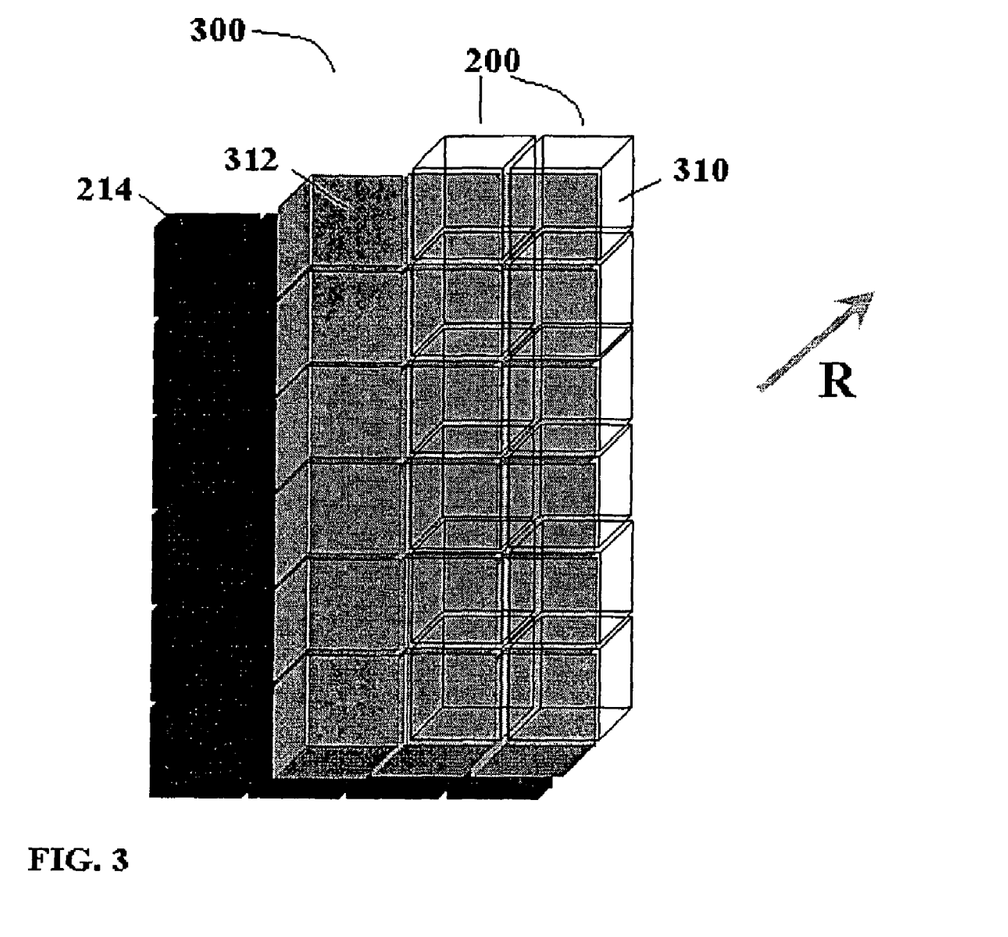
FIG. 3 shows a cut-away perspective view of an array of LC display structures according to the first embodiment to form a billboard.

In overview, the invention provides a device structure of the type shown in FIG. 2 for use, for example, in an electronic billboard or other information displays used in high or variable ambient light environments e.g. machine instrumentation, enunciator boards, or billboards as shown in FIG. 3. Device 200 comprises first and second LC active layers 210, 212 in conjunction with a reflective back plane 214 including three coloured reflective strips 214a, 214b, 214c forming sub-pixels disposed transverse to the direction of reflection (shown by arrow R) i.e. transverse to the direction perpendicular to the layer of the back plane. The LC active layers 210, 212 comprise an array of respective selector elements overlaying each back plane sub-pixel 214a, 214b, 214c. In particular the LC active layers 210, 212 are stacked relative to one another in the direction of reflection with a lower LC active layer 212 being doped with black dye and the upper LC active layer 210 being blank (un-doped). As a result the LC active layers 210, 212 can be controlled to allow a predetermined portion of light to be reflected out of the device from the respective coloured back plane strips 214a, 214b, 214c hence providing a pixel providing a full colour range. In addition a strong white colour can be achieved by switching the upper blank LC active layer 210 to an extreme scattered state and a strong black colour can be obtained by switching the lower black dye-doped LC active layer 212 to an extreme scattered state. Thus the invention provides a pure black and a pure white. In the preferred embodiment the coloured back plane strips 214a, 214b, 214c follow the Cyan Magenta Yellow (CMY) scheme and the LC active layers are of Smectic-A LC material.

Alternatively, a stacked configuration of the type shown in FIG. 9 can be implemented as discussed in more detail below.

Figure 9:
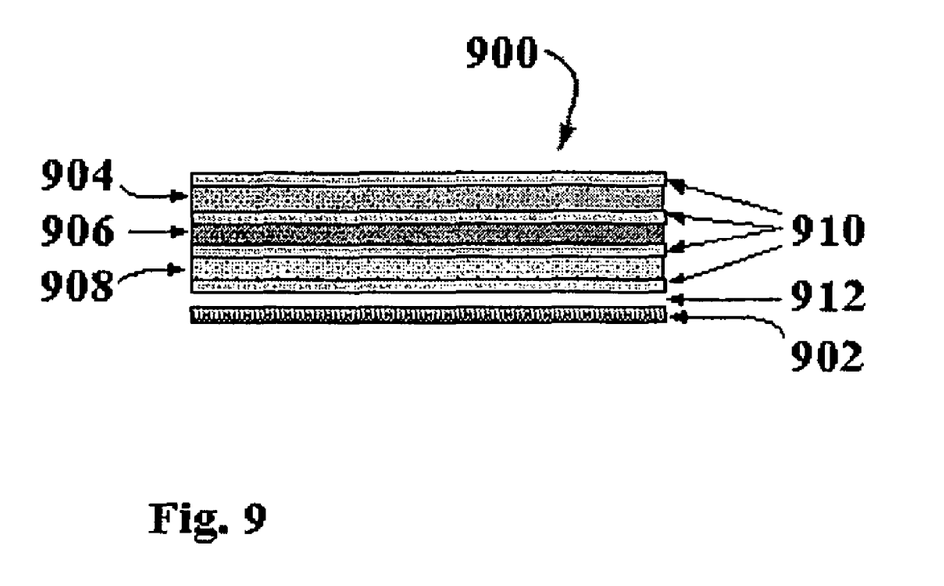
FIG. 9 shows a side sectional view of an LC structure according to a second embodiment of the invention.

Multiple structures of the type shown in FIG. 2 or FIG. 9 are laid out in pixel formation as an array forming a billboard as shown in FIG. 3 allowing colour image formation by individual control of each pixel and of sub-pixels within each pixel. In addition to billboards the arrangement is useful for any large scale, slow refresh rate or substantially unchanging displays arranged to be viewed from a distance such as posters or other information displays used in high or variable ambient light environments e.g. machine instrumentation, enunciator boards, military hardware controls.

Smectic-A materials are simple to align and form very stable focal conic (scattering) structures which allow multi-stability. They make good hosts for guest-host mixtures with dyes as they generally align the dyes well to give high order parameters. They can be prepared with wide phase temperature ranges. With high dielectric anisotropies they can be switched from the scattered state at around 100V or so in 10 micrometre thick cells. Because of the use of Smectic-A liquid crystal material, a multi-stable (capable of 8 or more stable states) display is provided which, when switched, will remain in the state to which it is switched providing a static pixel having, by virtue of the black dye-doped LC active layer, a grey scale range. This means that the display does not need a continual supply of electricity in order to function. This not only means a reduction in operating costs but also that the displays can be positioned in remote locations where mains electricity is not available. For example, battery power or a portable servicing unit capable of switching the LC active layers can be implemented to display the desired image. Furthermore the structure provides long lifetime and good stability, even for outdoor viewing. Further still, in such static or near static arrangements a slower switching time can be tolerated as a result of which a passive matrix switching structure can be adopted. This leads to an easier and cheaper production process than that used by displays which require active matrix switching and Thin Film Transistors TFT's.

The invention can be understood in more detail reverting to FIG. 2. Each of the LC active layers 210, 212 is encased top and bottom in an appropriate protective substrate 220, 222, 224, 226 such as a glass substrate coated, on one or both sides, in a suitable conducting material such as Indium Tin Oxide (ITO). Preferably, a plastic substrate is used, coated on one or both sides in a suitable conducting material such as ITO. Any transparent plastic that can withstand the processing temperatures required for alignment of the LC active layers will be suitable. Conventional plastics used in LCD's are made with no birefringence. However, unlike many conventional LCD's, polarisers are not used in the present invention and thus birefringence is not important. Therefore materials that have birefringence can be used, for example polyester (PET (polyethyleneterephthalate) known under various trading names such as Mylar or Melinex from DuPont) or nylon. Such materials are stretched during processing and have inherent birefringence, making them unsuitable for polariser based LCD's. Of course conventional plastic materials used for liquid crystals could be used such as PES (poly-ethersulfone).

The thickness of an LC pixel is predominantly due to the glass substrate. A plastic substrate can be made many times thinner than a glass substrate, for example it can be made to a thickness of 200 μm. Thus the use of plastics has the benefit that a thinner pixel could be made, which allows for a larger viewing angle. An additional benefit is that plastic substrates are easier and cheaper to manufacture.

Each LC active layer and its substrates can be treated as a single LC element. The two LC elements are further separated by a relatively small air gap 228. The relative size of this air gap is not important as long as no optical contact is made between the two substrates, which can help to increase the scattering effect of top white layer. The lower LC element 212; 224; 226 is separated from the back plane 214a, 214b, 214c by an air gap 230 to enhance absorption in the bottom black layer due to more scattered light routes, but the air gap distance should not exceed half of the pixel dimension.

The Smectic-A liquid crystal material is preferably a mixture of cyanobiphenyl components (Merck) or Siloxane materials (available from Dow Corning). Any material that gives a non-chiral Smectic A is suitable, e.g. Siloxanes with suitable LC moieties and hydrocarbon end chains or Cyanobiphenyls such as 8CB and 10CB mixtures.

Figure 4:
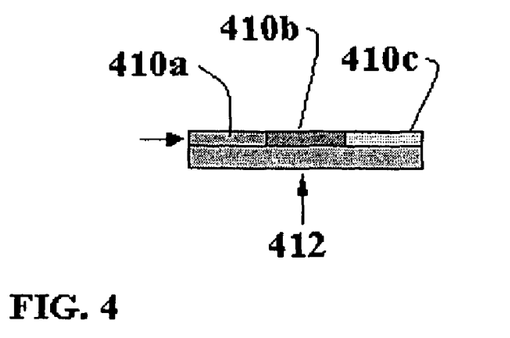
FIG. 4 is a side sectional view of a first type of reflector used in the first embodiment.
Figure 5:
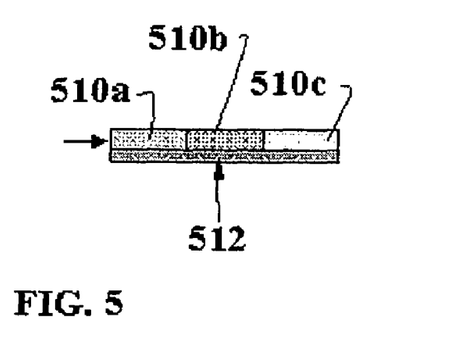
FIG. 5 is a side sectional view of a second type of reflector used in the first embodiment.

The back plane can be made by either solid colour painting 410a, 410b, 410c on normal plastic sheet 412 as shown in FIG. 4 or transparent colour plastic sheet 510a, 510b, 510c with high reflective aluminium coating 512 on its back for higher brightness as shown in FIG. 5. Both structures can provide colour strips for sub-pixels. Surface relief structures can be embossed on these surfaces to increase the lightness albeit at the expense of viewing angle. Alternatively a white reflector, other non specular reflector or a reflector with gain can be used. Luminous or fluorescent paint or plastic is advantageous as it enhances brightness.

As mentioned above, any appropriate switching structure can be provided for controlling the LC display, with the ITO substrate coating acting as electrode for each selector element of the LC active layer. For example a passive matrix structure of the type that will be familiar to the skilled reader can be adopted. A suitable passive matrix scheme is the blanking and 'third select' scheme where the cell is first scattered completely with a low frequency (e.g. 50 Hz) voltage (blanked) and then a pattern is cleared in the device by addressing rows a line at a time with a higher frequency (e.g. 2 kHz) 'strobe' voltage (Vs) equal to twice the 'data' voltage (Vd), i.e. Vs=2Vd. Vd is applied simultaneously and with the same frequency as Vs to each column. The data voltages are either in phase (subtract from Vs) or out of phase (add to Vs) with the strobe voltages. Thus the uncleared pixels see Vs−(+Vd)=Vd and the cleared pixels see Vs−(−Vd)=3Vd. When the row is not being addressed it is earthed so that it sees only Vd across it. So provided the cell is switched by 3Vd and is unaffected by Vd, the pattern is formed.

The display is capable of remote refresh, i.e. it can be refreshed, changed, updated or serviced remotely without the requirement of the physical presence of a servicing engineer to be in close proximity to the display. Hence previously inaccessible and difficult to service display sites are more easily and cost efficiently serviced.

Remote refreshing is carried out by having a switching structure that is capable of being remotely controlled. For example display control signals can be transmitted to the switching structure via a wireless connection or a wired connection. Alternatively the switching structure can be pre-programmed with an update schedule that causes it to automatically update the display at a desired time.

Referring once again to FIG. 2, in operation the top blank (no doped dyes) LC active layer 210 of the Smectic-A liquid crystal pixel, is used to control the proportion of light transmitted or scattered. When the top LC active layer 210 is switched to be the extreme scattered state, most of the light will be scattered, rather than transmit through the LC active layer. Therefore, the pixel will appear white. Alternatively, if it is switched to the extreme clear state, the light will go through the top LC active layer and then reach the bottom black dye LC active layer 212. Similarly, the black dye LC active layer 212 can control the light transmitted and absorbed in different proportions such that some of the light will go through the air gap 230 to the back colour strips 214a, 214b, 214c. By mixing the three main colours (Cyan, Magenta and Yellow—CMY) and blackness (K) via the black LC active layer 212, a display is provided with a range of colour gamut based on the CMYK colour system. These three main colours are preferred to the three primary colours (Red, Green and Blue) because of their luminance in a reflective mode. Theoretically, Cyan, Magenta and Yellow can only absorb one third of the white ambient light and reflect the rest whereas Red, Green and Blue will absorb two thirds of the light respectively. Therefore, far more brightness is achieved, which is a very important advantage for reflective mode displays. However, in certain circumstances where high colour saturation is required, the RGB system can be applied rather than the CMYK system.

Selection of the dimension of the air gaps 228 and 230 (which can be replaced by any appropriate optical or decoupling gap discontinuity) can also affect operation of the structure 200. The air gap 230 between the bottom black dye LC element 224; 212; 226 and the colour backplane 214a, 214b, 214c is very important, since the scattering effect can be remarkably increased when increasing the air gap distance. Also, the air gap 228 between the two liquid crystal elements 220; 210; 222 and 224; 212; 226 is helpful to increase the scattering effect of the top blank LC active layer.

In particular the separation provided by the air gap 230 between the lower LC element 224; 212; 226 and the back plane 212a, 212b, 212c is important for optimised contrast and colour saturation. It is found that contrast and colour saturation of the display are improved by increasing this air gap distance. However there is a trade-off, as the greater the air gap the smaller the viewing angle; in particular some colour information will be lost by viewing a structure with a large air gap from certain angles rather than directly from the front. Where the air gap distance is large compared to the pixel dimension, such parallax problems can especially arise. In one possible embodiment the dimension of a pixel (i.e. a set of three basic colour back plane strips) is of the order of millimetres, for example, 2 mm pitch width for each colour strip, so 6 mm for each pixel, and the preferred air gap is <2 mm, about 1 to 2 mm. Generally the air gap is dimensioned such that a suitable compromise is made between being as small as possible to improve the viewing angle whilst large enough to providing a good black state, i.e. high contrast and colour saturation such that the light is impervious to the LC active layer. The precise dimensions and relative ratios of the air gap (or any appropriate optical decoupling discontinuity) and pixel dimensions depend on the intended application of the display and can be determined by routine experimentation.

The air gap 228, or any appropriate optical decoupling discontinuity, between the LC elements 220; 210; 222 and 224; 212; 226 (i.e. between the supporting substrates 222, 224) is provided because optical contact, for example by using reflective index matching liquid between the two LC elements, does not enhance the scattering effect and in particular the back plane colour strips 214a, 214b, 214c can not be blocked efficiently in such an arrangement. However leaving a very small air gap or other discontinuity, for example in the range of less than 1 mm, provides improved results and indeed it is found that with an air gap the bottom black dye LC element 224; 212; 226 in fact helps the top blank LC element 220; 210; 222 to block light from the colour back plane 214a, 214b, 214c. This is because the system is a sandwich-like structure with different refractive indices of neighbour layers (substrates, LC active layers and air gaps). The light reflected from the back plane will be scattered more between these layers such that a better scattering effect is achieved.

Figure 6:
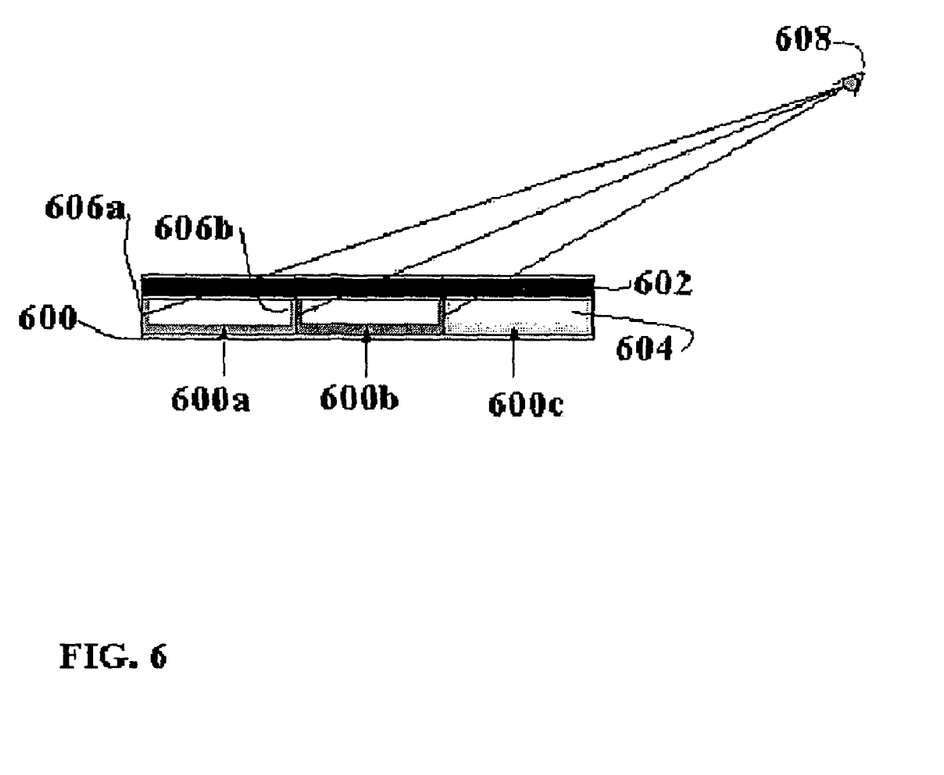
FIG. 6 shows a side sectional view of a reflector structure according to the first embodiment.

As mentioned above, although a comparatively large air gap between the lower LC element and the back plane 214 is preferred, this can be at the cost of a reduced viewing angle. Accordingly one proposed preferred form of the back plane is shown in FIG. 6. In particular it will be seen that the back plane 600 includes sub-pixels of different colours 600a, 600b, 600c separated from an LC structure of the type described above designated generally 602 by an air gap 604. Each sub-pixel 600a, 600b, 600c includes a rear planar portion on the back plane 600 as well as side walls extending perpendicular to the back plane as far as the LC structure 602. As can be seen, for example, from the sub-pixel 600a the side walls 606a, 606b are also coloured or coated in the same manner as the back plane. As a result a viewer 608 can see colour information from each sub-pixel 600a, 600b, 600c even at a large viewing angle by virtue of the recessed pixel colour reflector shown. Once again there is a trade off with air gap size and in particular if the air gap is large compared to the sub-pixel dimension the sub-pixel may not appear uniform because the colour will appear in different grey scales due to the different distances that the light travels in the air gap and so once again a preferred size for the air gap is of the order of the size of one sub-pixel.

Figures 7A, 7B:
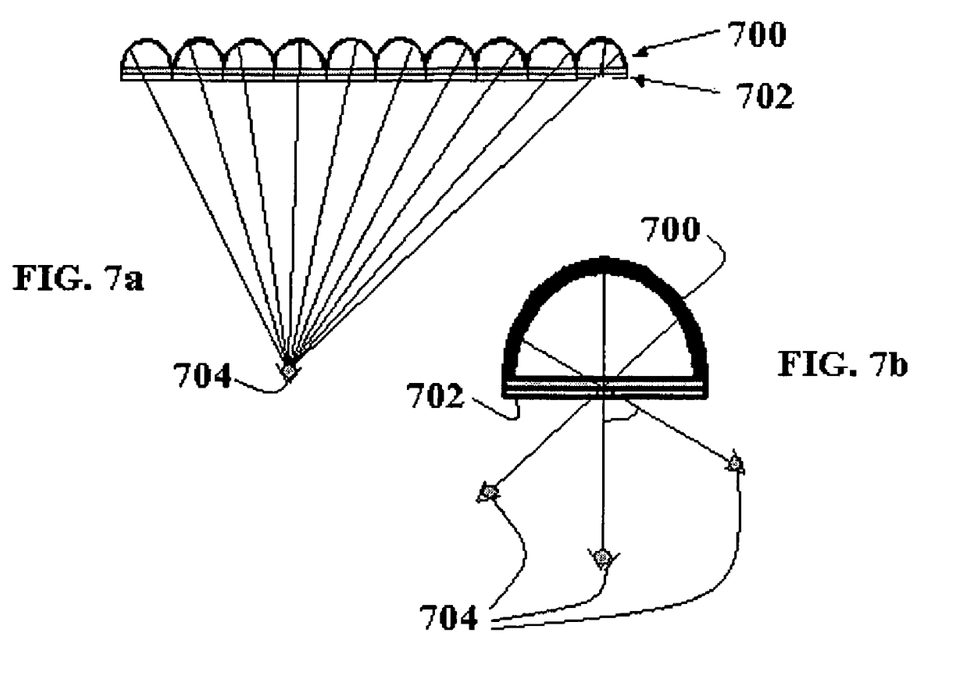

Referring to FIGS. 7a and 7b an alternative form for the sub-pixels is shown. In particular each sub-pixel 700 is generally hemispherical in shape and coloured or coated on its inner surface facing the LC structure designated generally 702. As a result a viewer 704 has a viewing angle up to 90° either side of normal. Because of the structure shown the sub-pixels 700 will appear the same whatever the viewing angle even with a large air gap. For instance if the pixel is 5 mm in diameter then the air gap can also increase to 5 mm for all viewing angles as the light will always travel the same distance in the air gap.

Figures 8A, 8B, 8C:
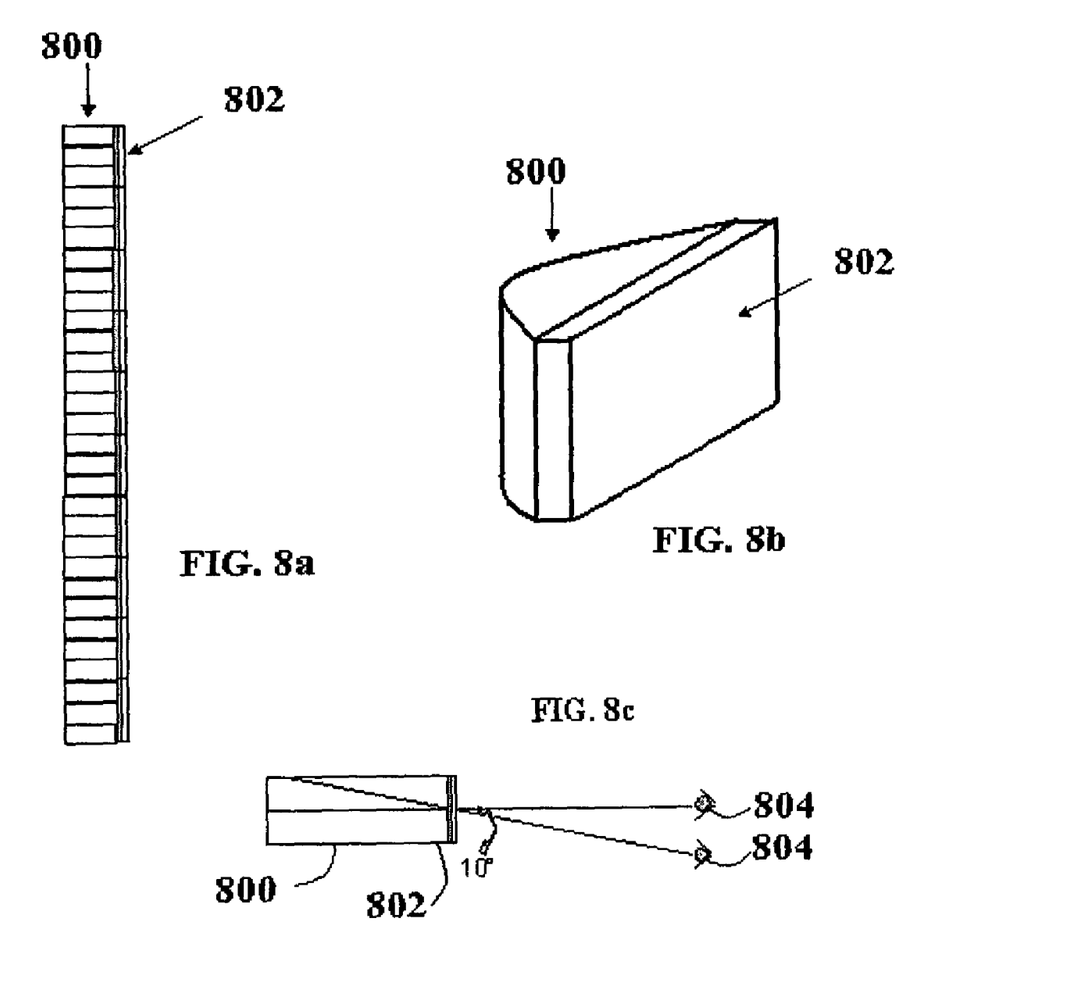

Referring now to FIGS. 8a and 8b a plurality of sub-pixels 800 can be seen of respective different sub-pixel colours as discussed above in conjunction with an LC structure designated generally 802 and of the type described above. As can be seen from FIG. 8b, in this case the sub-pixel back plane is generally semi-cylindrical in profile. As a result a 180° range of viewing angle is still available in the horizontal dimension although, as can be seen in FIG. 8c a more limited viewing angle is available to the viewer 804 in the vertical plane, for example a viewing angle of 10° either side of normal.

In a second embodiment shown in FIG. 9 an alternative LC structure designated generally 900 is shown. The structure includes an aluminium or other metal coated back substrate or back area 902 providing high reflectivity. Alternatively a white reflector, other non specular reflector or reflector with gain can be used. As with the first embodiment, this reflective back area can have one of rectangular, hemispherical or semi-cylindrical shape. Three colour dye doped Smectic-A LC active layers 904, 906, 908 are provided each sandwiched between an appropriate protective substrate 910 such as a plastic or glass substrate coated, on one or both sides, in Indium Tin Oxide (ITO). Each LC active layer and its substrates can be treated as a single LC element. The three colour dye doped Smectic-A LC active layers are separated from the back reflective area by an air gap 912 (which can be replaced by any appropriate optical decoupling discontinuity). The separation provided by the air gap 912 between the lower LC element 908; 910 and the reflective back area 902 is important for optimised contrast and colour saturation. However there is a trade-off as the greater the air gap the smaller the viewing angle. The size of a pixel is preferably in the size range of 2-10 mm, more preferably 3-6 mm. In one possible embodiment suitable for 6-sheet sized posters, the dimension of a pixel is of the order of 6 millimetres and the preferred air gap is about 1 to 2 mm. Again, generally the air gap is dimensioned such that a suitable compromise is made between being as small as possible to improve the viewing angle whilst large enough to providing a good colour state, i.e. high contrast and colour. Preferably the air gap is dimensioned up to a maximum of 20% of the dimension of the pixel.

The stacked colour dye doped LC active layers are doped with primary dyes Cyan, Magenta and Yellow (in any order) which can absorb one of the three primary colours Red, Green and Blue respectively. Perylene based dyes are suitable for providing a stable colour which does not fade or bleach in direct sunlight and are appropriate for outdoor usage.

In this structure, ambient white light will be partially absorbed in each LC active layer 904, 906, 908 but some will be scattered. Part of the scattered light will be directly reflected and the rest will pass through the active layers and be reflected by the metal coating surface of the backplane 902. By controlling the colour absorption proportions in each active layer, a pixel is achieved with a complete colour range.

An array of different coloured pixels on a display panel will form a modulated colour image.

The ambient white light preferably passes through all of the three active layers 904, 906, 908 to make a balanced colour selection. If liquid crystals have high birefringence, much light will be scattered and blocked by the top layer, rather than pass through to reach the next layer. Therefore, low birefringence liquid crystals are preferred. In addition, optical contact between any two neighbour LC elements is necessary. Thus, refractive index matching liquid is used between cells where necessary.

In the embodiment shown the preferred LC material has a low birefringence. One such material might be one that has no conjugated rings as these have low birefringence. The refractive index matching liquid has a refractive index very close to the substrates, say, 1.50 for glass substrates.

The manner in which the individual sub-pixels and the full array are fabricated will be well known to the skilled person and is not described in detail here. Similarly the production and, where appropriate, colour doping of the Smectic-A LC material and the formation of the LC cells can be carried out using any appropriate process. Fabrication of the reflective back plane and the reflector profile as discussed above can be according to any appropriate manner as can introduction of the passive matrix control. The pixels or sub-pixels can be fabricated individually and mounted in an array or an entire array can be fabricated simultaneously.

It will be appreciated that any appropriate colour system can be adopted for example CMY or RGB. Where CMY is adopted it is possible to use an existing RGB scheme together with an appropriate mapping as will be apparent to the skilled reader, to allow any desired colour to be obtained and to allow existing RGB control software to be implemented with a simple software or hardware adjustment to control the device. In fact it is found that using a CMYK scheme with 8-bit colour range for each of these sub-pixels (so 24 bit for one pixel) can provide $2.5 \times 10^7$ colours, an improvement on a 24 bit RGB system which provides $1.7 \times 10^7$ colours.

Because of the stability and large size of the pixels one preferred implementation of the LC structure is within a poster or similar structure as is shown in FIG. 3. The LC structures 200, comprising of an upper blank (no dye) LC element 310 and lower black LC element 312 and reflective back plane 214, are arranged in an array to form a display 300, for example, a billboard, public notice or notice board, hoarding or other signage and indeed any indoor or outdoor display viewable from a distance and/or by multiple viewers simultaneously. These applications require neither high resolution nor high refresh rates. They are typically viewed from a large distance, e.g. over 10 metres, in contrast to the tens of centimetres or few metres viewing distances used for the small-scale displays.

The advertising industry requires large-scale displays, sizes ranging from 6-sheet (1.8 m×1.2 m portrait) up to 64-sheet (3.0 m×8. m landscape), that have a reasonable image quality over a large viewing angle (preferably 120° centred on the normal to the display.). Conventional displays can not achieve such a high viewing angle and normally achieve only in the region of 60°.

Furthermore, many companies have particular colours associated with their logos or advertisements and desire high fidelity colour matching i.e. to have their exact colour reproduced in their posters. Therefore displays must be capable of producing a full gamut of colour. Many displays, such as Bragg reflector based displays, can not reproduce the full gamut of colour required for high fidelity colour matching in contrast to the structure according to the invention.

Yet further, where poster sites are inaccessible and more difficult to service the costs involved in the servicing and in particular changing the display increases dramatically. Inaccessible and difficult to service poster sites include: the side of a bridge, an overhead gantry or a location which does not allow access to poster servicing synchronised with campaign launch requirements. Since the electronic billboards do not require physical access to be serviced due to their ability to be remotely refreshed; the scheduling of service, synchronisation of updating the billboards and health and safety issues involved in the servicing are mitigated. These sites tend to be of high value because of their large viewing area and large number of potential viewers, but have not previously been economic to exploit. In addition, the dimensions of these sites are often not of industry standard size and shape, e.g. 6-sheet up to 64-sheet, which means an additional expense of one off print runs are required. This is not a concern according to the invention which can simply tile pixels, arrays of pixels or panels of arrays to the desired dimensions and shapes.

An important concept in large-scale displays is image fusion distance, this is defined as the distance at which the pixels or elements of a display are no longer seen individually but appear merged or fused together. For the displayed image to look correct and not pixellated, the viewing distance must be greater than the fusion distance; the larger the pixel size the larger the fusion distance. A large viewing distance permits a large fusion distance, which in turn permits the use of large pixel sizes. A larger pixel, or more precisely a larger ratio of pixel width (dimension transverse to the direction of reflection) to pixel thickness (dimension parallel to the direction of reflection, i.e. total thickness of back plane, air gaps, LC active layers and substrates) has the additional benefit of having a larger viewing angle.

The invention makes use of the fact that for its intended applications it can use large pixel sizes, with dimensions in the region of 2 to 10 millimetres. For example a 6-sheet sized poster could have pixels of size 3 to 6 millimetres compared to the sub millimetre pixel size used for small-scale displays. Also the invention uses high pixel width to pixel thickness ratios, such as a pixel width/thickness ratio ranging from 5/1 up to 20/1 but more preferably ranging from 8/1 up to 12/1 for the first embodiment and 10/1 up to 14/1 for the second embodiment. A pixel width/thickness ratio of 10/1 is most preferable for the first embodiment, this provides a satisfactory viewing angle of about 120°. A pixel width/thickness ratio of about 12/1 is most preferable for the second embodiment.

As a result a favorable compromise between viewability and fusion distance is obtained and indeed a fusion distance as low as 10 m for a 6-sheet poster is achieved.

As a result of the arrangement discussed above significant improvements are provided over known approaches. For example one known LC poster produced by "Magink" relies on Bragg reflectors comprising tight pitch cholesterics. Such an arrangement is limited to the spectral colours selected by the Bragg reflectors. This certainly is not able to reproduce a full gamut of colour and is unable to provide high fidelity colour matching.

It will be appreciated that any of the components and features of any embodiment or sub-embodiment can be incorporated with any other embodiment as appropriate. Any type of liquid crystal having the required properties corresponding to those of Smectic-A can be used. For example, it could be possible to use plastic liquid crystals or have the liquid crystals dispersed in the substrate.

The embodiments discussed above contain air gaps. However, in alternative embodiments there can be no air gaps or other optical or decoupling gap discontinuities. I.e. there can be alternative embodiments with one or both of the air gaps 228 and 230 from the first embodiment removed and similarly air gap 912 from the second embodiment removed such that the LC elements are in optical contact with each other and the back plane.

Although reflective mode is discussed above (where the incident light is from sources such as sunlight, ambient light or a specific appropriate light source) it will be appreciated that a back light transmissive mode can be adopted instead wherein the reflective backplane is replaced by a light source of any appropriate type and, where appropriate, colour filters to replace the colour reflective portions. In the back light mode, instead of having reflective regions and coloured reflective back areas, there can be colour display regions or colour display back areas (using coloured filters) in which the back lights create display light in a display direction and the LC active layers are disposed in the display direction (the display direction being equivalent to the reflection direction).

Similarly although a CMYK colour scheme is described alternatively an RGB scheme can be used providing more saturated RGB colours or any other appropriate colour scheme can be adopted. The LC elements, whether colour doped, blank or black doped can be placed in any appropriate order. The pixels and sub-pixels can be in any appropriate configuration and the sub-pixels may be of any appropriate shape to achieve a desired display.

The invention claimed is:

1. A liquid crystal structure for a display comprising:
   a reflective back plane defining a direction of reflection perpendicular to the reflective back plane;
   a first liquid crystal layer superposed over the reflective back plane in the direction of reflection; and
   a second liquid crystal layer disposed between the first liquid crystal layer and the reflective back plane;
   wherein the liquid crystal layers comprise Smectic-A liquid crystal and at least one of the Smectic-A liquid crystal layers is doped with a dye.

2. The structure of claim 1 in which the Smectic-A liquid crystal is enclosed in a plastic substrate.

3. The structure of claim 2 in which the plastic substrate comprises a birefringent plastic.

4. The structure of claim 1 in which the first liquid crystal layer is not dye-doped and is controllable to transmit or scatter incident light.

5. The structure of claim 4 in which the second liquid crystal layer is black dye-doped.

6. The structure of claim 1 in which there is an optical decoupling discontinuity between the first liquid crystal layer and the second liquid crystal layer.

7. The structure of claim 1 in which there is an optical decoupling discontinuity between the second liquid crystal layer and the reflective back plane.

8. The structure of claim 1 thereon wherein the reflective back plane comprises one of Cyan, Magenta and Yellow or Red, Green and Blue.

9. The structure of claim 1 in which the reflective back plane comprises one of a reflective color strip and a color filter superposed over a reflector in the direction of reflection.

10. The structure of claim 1 in which the liquid crystal layers are optically continuously coupled to one another.

11. The structure of claim 1 in which the Smectic-A liquid crystal has a low birefringence.

12. The structure of claim 1 wherein the dye is Perylene based.

13. An array of structures, each comprising: a reflective back plane defining a direction of reflection perpendicular to the reflective back plane; a first liquid crystal layer superposed over the reflective back plane in the direction of reflection; a second liquid crystal layer disposed between the first liquid crystal layer and the reflective back plane, wherein the liquid crystal layers comprise Smectic-A liquid crystal; and at least one of the Smectic-A liquid crystal layers is doped with a dye, the array further comprising a passive matrix control scheme arranged to control the liquid crystal layers.

14. A display comprising at least one liquid crystal structure comprising:
   a reflective back plane defining a direction of reflection perpendicular to the reflective back plane;
   a first liquid crystal layer superposed over the reflective back plane in the direction of reflection; and
   a second liquid crystal layer disposed between the first liquid crystal layer and the reflective back plane;
   wherein the liquid crystal layers comprise Smectic-A liquid crystal and at least one of the Smectic-A liquid crystal layers is doped with a dye.

15. A billboard comprising the display of claim 14.

16. A liquid crystal structure for a display comprising:
   a reflective back plane defining a direction of reflection perpendicular to the reflective back plane; and
   plural dye-doped liquid crystal layers superposed over the reflective back plane in the direction of reflection;
   wherein the liquid crystal layers comprise Smectic-A liquid crystal.

17. The structure of claim 16 in which the Smectic-A liquid crystal is enclosed in a plastic substrate and preferably in which the plastic substrate comprises a birefringent plastic.

18. The structure of claim 16 further comprising an optical decoupling discontinuity between the first liquid crystal layer and the second liquid crystal layer.

19. The structure of claim 16 further comprising an optical decoupling discontinuity between the second liquid crystal layer and the reflective back plane.

20. The structure of claim 16 having three Smectic-A liquid crystal layers stacked over the reflective back plane, each arranged to absorb respective colors.

21. The structure of claim 20 wherein each of the first, second and third Smectic-A liquid crystal layers is color dye-doped, with a respective one of: Cyan, Magenta and Yellow or Red, Green and Blue.

22. The structure of claim 20 in which the liquid crystal layers are optically continuously coupled to one another.

23. The structure of claim 20 in which third liquid crystal layer closest to the reflective back plane is optically discontinuously coupled to the reflective back plane.

* * * * *